(12) United States Patent
Davis et al.

(10) Patent No.: US 7,972,493 B2
(45) Date of Patent: Jul. 5, 2011

(54) FILTER WASH FOR CHLORALKALI PROCESS

(75) Inventors: Dwight R. Davis, West Hartford, CT (US); Mike Raimer, Bear, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 670 days.

(21) Appl. No.: 11/829,628

(22) Filed: Jul. 27, 2007

(65) Prior Publication Data

US 2009/0026084 A1    Jan. 29, 2009

(51) Int. Cl.
*C25B 15/08*    (2006.01)
(52) U.S. Cl. ......................................... 205/536
(58) Field of Classification Search .................. 205/536
See application file for complete search history.

(56) References Cited

U.S. PATENT DOCUMENTS

| | | | | |
|---|---|---|---|---|
| 4,242,185 A | * | 12/1980 | McRae | 205/536 |
| 4,746,441 A | * | 5/1988 | Yagishita et al. | 210/712 |
| 5,034,127 A | | 7/1991 | Yagishita et al. | |
| 5,944,978 A | * | 8/1999 | Okazaki | 205/701 |
| 6,340,736 B1 | | 1/2002 | Coenen et al. | |

FOREIGN PATENT DOCUMENTS

| | | |
|---|---|---|
| JP | 61220709 | 10/1986 |
| JP | 7155515 | 6/1995 |
| JP | 2001079366 | 3/2001 |
| JP | 2001252536 | 9/2007 |

* cited by examiner

*Primary Examiner* — Arun S Phasge
(74) *Attorney, Agent, or Firm* — Richard W. Ellis (57) ABSTRACT

Filter wash methods and apparatuses for chloralkali processes are provided. The filter wash uses in-process fluids from the chloralkali process to wash filters. The in-process fluids may be drawn from a point in the chloralkali process where the in-process fluids contain active chlorine values such as bleach. A filter may then be isolated from the chloralkali process and contacted with the in-process fluids containing active chlorine values to wash the filter. The in-process fluids containing active chlorine values may be operable to oxidize organic material clinging to the filter, thereby cleaning the filter. After washing, the in-process fluids containing active chlorine values may be returned to the chloralkali process to a point at or near where they were drawn from. The filters may be membrane filters. The filters may comprise expanded polytetrafluoroethylene.

9 Claims, 4 Drawing Sheets

FILTER WASH FOR CHLORALKALI PROCESS

BACKGROUND

A chloralkali process is a process that produces chlorine or a related oxidizer and an alkaline salt such as sodium hydroxide ("NaOH," also known as lye and caustic). Chlorine and NaOH are among the most produced chemicals in the world and are used in the manufacturing of a wide range of materials and products.

Figure 1:
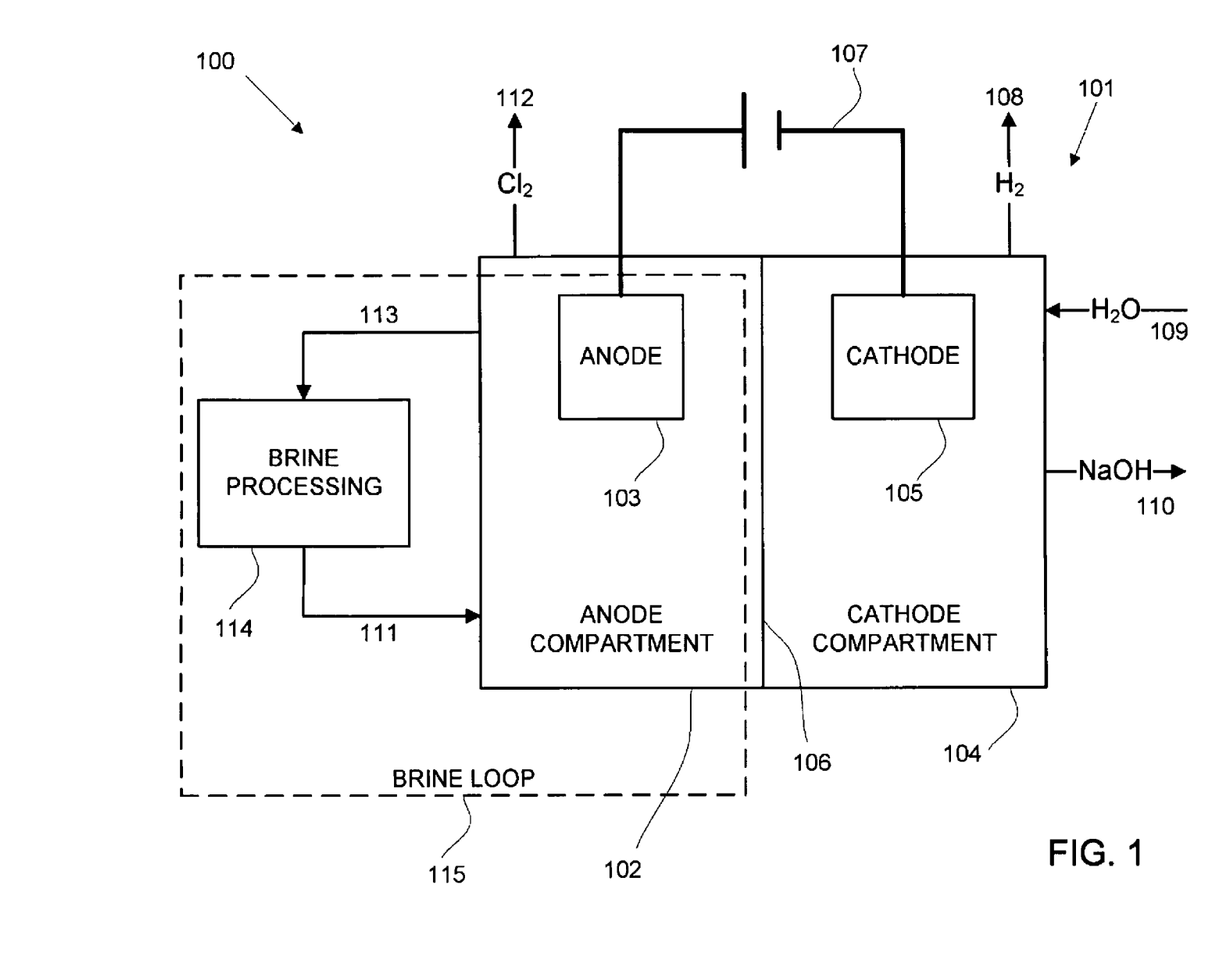
FIG. 1 is block diagram of a prior art chloralkali process flow.

An exemplary chloralkali process is illustrated in FIG. 1. The figure illustrates a typical brine electrolysis process 100 known to those skilled in the art using an electrolyzer. The electrolyzer of the illustrated typical brine electrolysis process 100 is a membrane cell 101. The membrane cell 101 includes an anode compartment 102, which contains an anode 103 and a cathode compartment 104, which contains a cathode 105. The anode and cathode compartments 102, 104 are separated from each other by a membrane 106. By way of example, the membrane 106 separating the anode and cathode compartments may be an ion exchange membrane. The membrane 106 separating the anode and cathode compartments may be operable to allow sodium ions and water to pass therethrough while preventing unreacted sodium chloride (NaCl) from entering the cathode compartment 104. A direct current 107 may be passed through the anode 103 and cathode 105. A stream 111 of saturated brine may be fed into the anode compartment 102 where chlorine from the NaCl is liberated at the positively charged anode 103. A portion of the chlorine, in the form of a gas, may be collected 112 from the anode compartment 102. Positively charged sodium ions from the NaCl migrate through the membrane 106 separating the anode and cathode compartments into the cathode compartment 105.

In the cathode compartment 104, hydrogen gas evolves from water molecules at the negatively charged cathode 105. The hydrogen gas may be collected 108 from the cathode compartment 104. The evolution of hydrogen from water also produces hydroxyl ions that react with the sodium ions to form NaOH. A portion of the NaOH is withdrawn 110 from the cathode compartment 104. Water may be added 109 to, and the NaOH may be withdrawn 110 from, the cathode compartment 104 to maintain desirable levels of NaOH in the cathode compartment 104. Accordingly, the overall reaction for the described chloralkali process is:

$2NaCl+2H_2O \rightarrow Cl_2+H_2+2NaOH$

A depleted brine (e.g., brine no longer saturated with NaCl) stream 113 may be removed from the anode compartment 102. The depleted brine may be processed through brine processing 114 that prepares a saturated brine stream 111 to be fed into the anode compartment. Accordingly, a brine loop 115 comprises brine processing 114 to produce a saturated brine stream 111, feeding the saturated brine stream 111 into the anode compartment 102, the anode compartment 102, and removing depleted brine from the anode compartment 102 via a depleted brine stream 113 which is then fed back into the brine processing 114.

Figure 2:
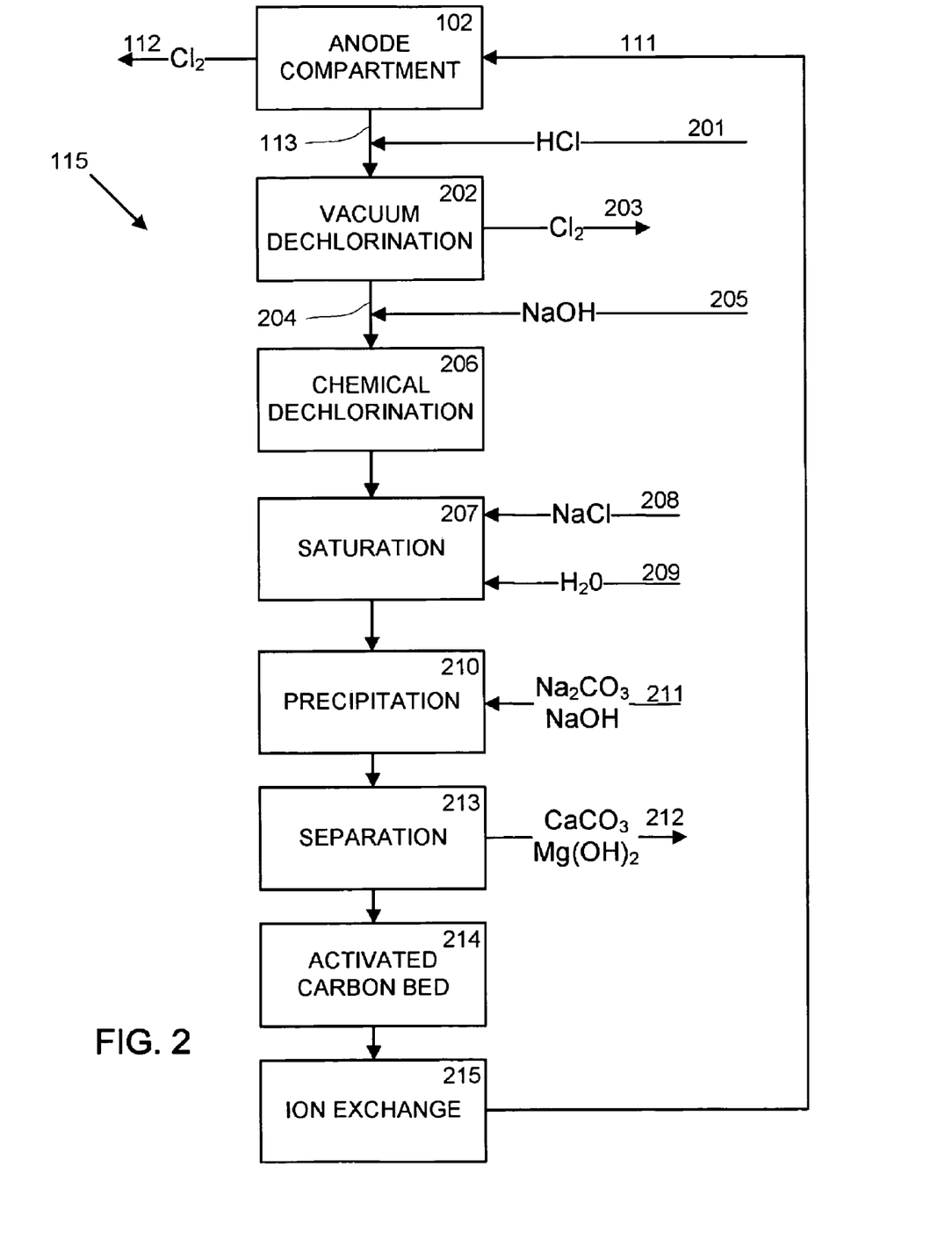
FIG. 2 is block diagram of a brine loop of the prior art chloralkali process flow of FIG. 1.

FIG. 2 illustrates a typical prior art brine loop 115 used in brine electrolysis. Hydrochloric acid (HCl) is added 201 to the depleted brine stream 113 removed from the anode compartment 102 to adjust the pH levels (e.g., increase acidity) of the depleted brine stream 113. This reduces the solubility of chlorine gas within the stream. The depleted brine stream 113 may then be subjected to vacuum dechlorination 202 where chlorine gas is drawn 203 from the depleted brine stream 113.

A vacuum dechlorinated depleted brine stream 204 may be fed from vacuum dechlorination 202 and into chemical dechlorination 206. NaOH may be added 205 to the vacuum dechlorinated depleted brine stream 204 to adjust the pH upward (e.g., to make the depleted brine stream neutral or slightly alkaline). The NaOH may also help to stop gaseous chlorine from evolving from the dechlorinated depleted brine stream 204. The chemical dechlorination 206 may be achieved in a variety of ways known to those skilled in the art (e.g., by adding reducing agents such as sodium bisulfite ($NaHSO_3$) and/or sodium sulfite ($Na_2SO_3$)).

After chemical dechlorination 206, the dechlorinated stream may be fed into a saturation step 207 where NaCl 208 may be added to create a saturated brine stream and water 209 may be added to replenish the volume of the stream and adjust the concentration of NaCl. Typically the NaCl 208 may include varying amounts of impurities that must be removed in order to run the membrane cell 101 at a high current efficiency. Major impurities typically include calcium, magnesium and sulfates. To remove these major impurities, the saturated brine stream may be passed through a precipitation process 210. This is typically a reactor or reactors where sodium carbonate ($Na_2CO_3$) and NaOH are added 211 to precipitate calcium carbonate ($CaCO_3$) and magnesium hydroxide ($Mg(OH)_2$). Depending on the particular impurities present, other reactions may be promoted.

The outflow of the precipitation process 210 may contain suspended solids from the precipitation process 210 and therefore is typically passed through a separation process 213. The separation process 213 may include the use of one or more gravity settlers, and/or one or more media filters including pre-coat and non pre-coat filters. The separation process may, for example, remove 212 precipitated $CaCO_3$ and $Mg(OH)_2$. The saturated brine stream may next be exposed to an optional activated carbon bed 214 to further remove any residual oxidizing materials. The saturated brine stream exiting the activated carbon bed 214, or the brine stream exiting the separation process 213 if an activated carbon bed 214 is not present, may still contain unacceptable levels of impurities. To further remove these impurities (e.g., calcium, magnesium, iron), the saturated brine stream may next be passed through an ion exchange process 215 that may include passing the saturated brine stream through a column containing an ion exchange resin. After the ion exchange process 215, the saturated brine stream 111 may be fed into the anode compartment 102 to complete the brine loop 115.

Known variations exist with respect to the above-described exemplary processes. For example, by altering process chemistry and temperature, the membrane cell 101 can be used to produce chlorate. It is also known by those skilled in the art that various steps as shown in the brine loop 115 may be added, altered or removed based on, inter alia, the quality of materials used in the process or manufacturing considerations. For example, in a particular brine loop, the activated carbon bed 214 may not be present, particularly if the levels of oxidizing materials in the brine stream after separation 213 are below a certain level. Furthermore, chloralkali processing may be achieved using, for example, mercury cells or diaphragm cells in place of the described membrane cells.

SUMMARY

The present inventors have recognized that the above brine processing may benefit from the replacement or enhancement of known separation processing with filtration. Filtration, as compared to known separation processing, may reduce system complexity, reduce system operating costs, and/or increase the quality of the saturated brine being delivered to the electrolyzer. The present inventors have also recognized that the above processes may contain contaminants, particularly organics introduced with the NaCl and/or process water. These organics may often include biological organics that may be characteristic of the NaCl source. Such biological contaminants may, for example, include humic acid and/or residue from algae in seawater. The organics may build up on and/or reduce the efficiency of filters used in a chloralkali process. Maintenance of filters, such as replacing the filters when they lose efficiency or cleaning the filters using known cleaning methods, such as the use of dedicated cleaning solutions, may be costly and time consuming and counterbalance the aforementioned benefits of the use of filtration.

In view of the foregoing, an object of embodiments described herein is to provide improved methods and apparatuses to clean filters used in chloralkali processes, thereby, for example, reducing the maintenance and operating costs associated with filtration while maintaining the benefits associated with filtration. In certain chloralkali processing plants, filtration may have previously been considered not to be economically feasible due to contamination levels and the associated costs of filtration (e.g., replacement costs and/or cleaning costs) due to those contamination levels. However, the reduced equipment, maintenance and operating costs associated with embodiments of filter washing methods and systems described herein may facilitate the use of filtration where contamination levels previously discouraged such use.

Another objective of embodiments described herein may be to provide a cleaning solution for cleaning filters used in chloralkali processes, thereby eliminating and/or reducing the need for separate chemicals and/or materials to clean the filters. Embodiments described herein may provide methods of washing filters in situ with cleaning solution from the chloralkali process and returning the cleaning solution to the chloralkali process after the filters are washed. Such embodiments provide filter washing systems that have low equipment and material requirements. Embodiments described herein may provide filter washing systems for chloralkali processes yielding reduced chemical and operating costs, improved in-process brine stream quality, and reduced equipment down time.

In an aspect, a method of brine electrolysis is provided. The method may include providing a brine feed and treating the brine feed to form a treated brine solution. The treating may include mixing the brine feed with reactants to precipitate solids. The method may further include filtering the treated brine solution with a filter material to form a brine filtrate and purifying the brine filtrate to form a purified brine. The purifying may include removing cations from the brine filtrate through an ion exchange process. The filter material may be a non-precoated filter material. The filter material may be a membrane filter and may comprise expanded polytetrafluoroethylene (ePTFE). The method may further include providing an electrolytic cell. The electrolytic cell may include a cathode disposed in a cathode compartment and an anode disposed in an anode compartment. A membrane (e.g., an ion exchange membrane) may separate the anode and cathode compartments from each other. The method may further include feeding the purified brine into the anode compartment. Within the anode compartment, chlorine may be liberated from the purified brine at the anode, and sodium ion and water may migrate from the anode compartment through the membrane separating the anode and cathode compartments to the cathode compartment. This egress of sodium ion and chlorine from the anode compartment may result in the formation of depleted brine within the anode compartment. The method may further include removing the depleted brine from the anode compartment, adding an acid (e.g., HCl) to the depleted brine removed from the anode compartment, and separating, after the adding an acid step, the depleted brine into a feed solution and a remaining portion. The feed solution may then be subjected to vacuum dechlorination and chemical dechlorination. The method may further include adding NaCl to the feed solution and adjusting the concentration of NaCl by adding water to form the brine feed. The method may further include contacting the filter material with the remaining portion. The contacting of the filter material with the remaining portion may remove material from the filter material. The removed material may include organic material and/or mineral scaling.

In another aspect, an improved method of brine electrolysis is provided. The method comprises a brine solution saturation step, a treatment step, a filtration step, an ion exchange step, an electrolysis step, and at least one dechlorination step. A first output of the at least one dechlorination step may be an input to the brine solution saturation step. The improvement of the method may comprise providing a second output from the at least one dechlorination step and contacting a filter of the filtration step with at least a portion of the second output. The contacting of the filter with the at least a portion of the second output may remove materials (e.g., organic materials and/or mineral scale) from the filter. The filter may be a membrane filter.

In an embodiment, the at least one dechlorination step may comprise a first vacuum dechlorination step and a second chemical dechlorination step. The second output may be disposed after the first vacuum dechlorination and before the second chemical dechlorination step. The second output may contain between about 0.01 parts per million (ppm) and about 200 ppm of active chlorine.

In an arrangement, the contacting step may include soaking the filter with the at least a portion of the second output. The contacting step may include circulating the at least a portion of the second output through the filter under pressure. The contacting step may include a combination of soaking and circulating.

In still another aspect, a method of electrolysis of filtered brine is provided. The method may comprise providing a brine feed solution, filtering the brine feed solution with a filter material to form a brine filtrate, and providing an electrolytic cell. The electrolytic cell may have a cathode disposed in a cathode compartment and an anode disposed in an anode compartment. A membrane may separate the cathode compartment from the anode compartment. The method may further comprise feeding the brine filtrate into the anode compartment. The brine filtrate may undergo electrolysis in the electrolytic cell, forming depleted brine in the anode compartment. The method may further comprise removing the depleted brine from the anode compartment and contacting the filter material with the depleted brine solution after the removing step. The contacting of the filter material with the depleted brine solution may remove at least some material (e.g., organic material and/or mineral scale) from the filter material. The filter material may include one or more filter membranes.

In yet another aspect, a method of washing a filter used in a chloralkali process is provided. The method may comprise isolating the filter from the chloralkali process, removing a portion of a flow of brine from within the chloralkali process, contacting the portion of flow to the isolated filter, and returning the filter to the chloralkali process after the contacting step. The removal of the portion of the flow of brine may be from a point in the chloralkali process between an output of a membrane cell and an input of a chemical dechlorination apparatus. The contacting of the portion of flow to the isolated filter may wash the filter.

The washing of the filter may result in the removal of organic materials and/or mineral scaling from the isolated filter. Regarding organic materials, the contacting step may comprise changing the organic material from a first state to a second state, wherein the organic material in the second state has a reduced affinity toward the filter relative to the organic material in the first state. By way of example, organic material in the second state may be less likely to be collected at the filter relative to organic material in the first state. Regarding mineral scaling, the portion of the flow may be acidic and the contacting step may comprise removing mineral scaling from the filter.

In an embodiment, the method may further comprise returning the portion of the flow to the chloralkali process after the contacting step. The portion of the flow may be returned to the chloralkali process between the output of the membrane cell and the input of the chemical dechlorination apparatus.

In an arrangement, the isolating step and the returning the filter step may comprise actuating one or more valves. In this regard, the filter may remain in situ during the performance of the method obviating the need to move the filter for cleaning.

The removed portion of the flow may comprise between about 0.01 ppm and about 250 ppm of active chlorine. In an embodiment, the portion of the flow may be removed from between the output of the membrane cell and an input of a vacuum dechlorination apparatus. In another embodiment, the portion of the flow may be removed from between an output of the vacuum dechlorination apparatus and an input of a chemical dechlorination apparatus. The portion of the flow may be returned to a point in the chloralkali process between an output of a vacuum dechlorination apparatus and an input of a chemical dechlorination apparatus.

The chloralkali process may include a plurality of filters. The current method may comprise performing the isolating, removing, contacting, returning the filter, and returning the portion of the flow steps for each of the plurality of filters. The method may be performed for each of the plurality of filters in succession. While the method is being performed on a particular one of the plurality of filters, the other filters of the plurality of filters may continue to filter the portion of the flow of brine that remained within the chloralkali process.

In still another aspect, an apparatus for washing a filter used in a brine loop of a chloralkali process is provided. The apparatus may comprise a wash tank, a first fluid interconnection, a second fluid interconnection, and a third fluid interconnection. The wash tank may be operable to hold a predeterminable volume of liquid. The first fluid interconnection may fluidly connect the wash tank and a portion of the brine loop between an output of a membrane cell and an input of a chemical dechlorination apparatus. The second fluid interconnection may be between the wash tank and an upstream side of the filter. The third fluid interconnection may interconnect the wash tank and a downstream side of the filter. The apparatus may be operable to cause fluid to flow from the wash tank, then through the filter, and then back to the wash tank.

In an embodiment, the filter may be a non-precoated filter and/or a membrane filter. The filter may comprise a fluoropolymer membrane. The fluoropolymer may, for example, comprise polytetrafluoroethylene (PTFE), ePTFE, and/or polyvinylidene difluoride (PVDF).

In an arrangement, the apparatus may further comprise a fourth fluid interconnection between the wash tank and a portion of the brine loop between an output of a vacuum dechlorination apparatus and an input of a chemical dechlorination apparatus. Furthermore, the first fluid interconnection may fluidly interconnect the wash tank and a portion of the brine loop between an output of the membrane cell and an input of a vacuum dechlorination apparatus. In the present arrangement, fluid may be operable to flow through the first fluid interconnection into the wash tank and through the fourth fluid interconnection from the wash tank. In this regard, in the current arrangement the apparatus may be operable to draw fluid into the wash tank, via the first fluid interconnection, from a point in the chloralkali process between the output of the membrane cell and the input of a vacuum dechlorination apparatus. Further in this regard, the apparatus may be operable to return fluid, via the fourth fluid interconnection, from the wash tank to a point in the chloralkali process between the output of the vacuum dechlorination apparatus and the input of the chemical dechlorination apparatus.

In an embodiment, the first fluid interconnection may be between the wash tank and a portion of the brine loop between an output of a vacuum dechlorination apparatus and an input of a chemical dechlorination apparatus. In such an embodiment, the apparatus for washing a filter may further comprise a fourth fluid interconnection between the wash tank and the portion of the brine loop between the output of the vacuum dechlorination apparatus and the input of the chemical dechlorination apparatus. In the instant embodiment, fluid may be operable to flow through the first fluid interconnection into the wash tank and through the fourth fluid interconnection from the wash tank. In this regard, the apparatus may be operable to draw fluid into the wash tank, via the first fluid interconnection, from a point in the chloralkali process between the output of the vacuum dechlorination apparatus and the input of the chemical dechlorination apparatus. Further in this regard, the apparatus may be operable to return fluid, via the fourth fluid interconnection, from the wash tank to a point in the chloralkali process between the output of the vacuum dechlorination apparatus and the input of the chemical dechlorination apparatus.

The apparatus may comprise a pump operable to selectively pump fluid from the wash tank through the second fluid interconnection, through the fourth fluid interconnection, or through a combination of the second and fourth fluid interconnections. In this regard, fluid pumped through the second fluid interconnection may contact the upstream side of the filter.

In an embodiment where the first fluid interconnection is between the wash tank and a portion of the brine loop between an output of a vacuum dechlorination apparatus and an input of a chemical dechlorination apparatus, the apparatus may be operable to selectively flow fluid through the first fluid interconnection into the wash tank or through the first fluid interconnection from the wash tank. In this regard, the first fluid interconnection may be used to selectively fill or empty the wash tank.

In an arrangement, the apparatus may further comprise at least one fluid pump operable to pump fluid from the wash tank through the second fluid interconnection and through the filter. In an arrangement, the filter may be disposed downstream from a precipitation apparatus and upstream from an ion exchange apparatus.

In an embodiment, the apparatus for washing a filter may be operable to cause fluid to flow from the wash tank, then through the second fluid interconnection, then through the filter, then through the third fluid interconnection, and then back to the wash tank. Valving may be included that is operable to fluidly isolate the filter from the brine loop of the chloralkali process. Valving may also be included that is operable to fluidly isolate the apparatus for washing a filter from the brine loop.

In a configuration the brine loop may comprise a plurality of filters. The plurality of filters may be divided into a plurality of sub-groups. In such a configuration, the apparatus for washing a filter may further comprise valving operable to fluidly isolate, in succession, each of the sub-groups from the brine loop of the chloralkali process. Each of the sub-groups may comprise one and only one of the plurality of filters. Alternatively, some of the sub-groups may include a single filter and some of the sub-groups may contain multiple filters. Alternatively, each of the sub-groups may include more than one of the plurality of filters.

The various methods discussed above may be performed manually, automatically, or through a combination thereof. Moreover, the initiation of the performance of any of the methods may be achieved in an automated fashion, manually, or through a combination of automated and manual actions. Similarly, the apparatuses discussed above may be operable to function automatically and/or manually.

The various features, arrangements and embodiments discussed above in relation to each aforementioned aspect may be utilized by any of the aforementioned aspects. Additional aspects and corresponding advantages will be apparent to those skilled in the art upon consideration of the further description that follows.

DETAILED DESCRIPTION

FIGS. 1 and 2 represent exemplary membrane cells 101 and brine loops 115 known to those skilled in the art of brine electrolysis and/or chloralkali processing. Variation to these processes and apparatuses are also known to those skilled in the art. Turning to the separation step 213 of the brine loop 115 of FIG. 2, known separation systems typically incorporate gravity settlers and media filters operable to remove a portion of the suspended solids that remain in the brine after the preceding precipitation 210 step.

Figure 3:
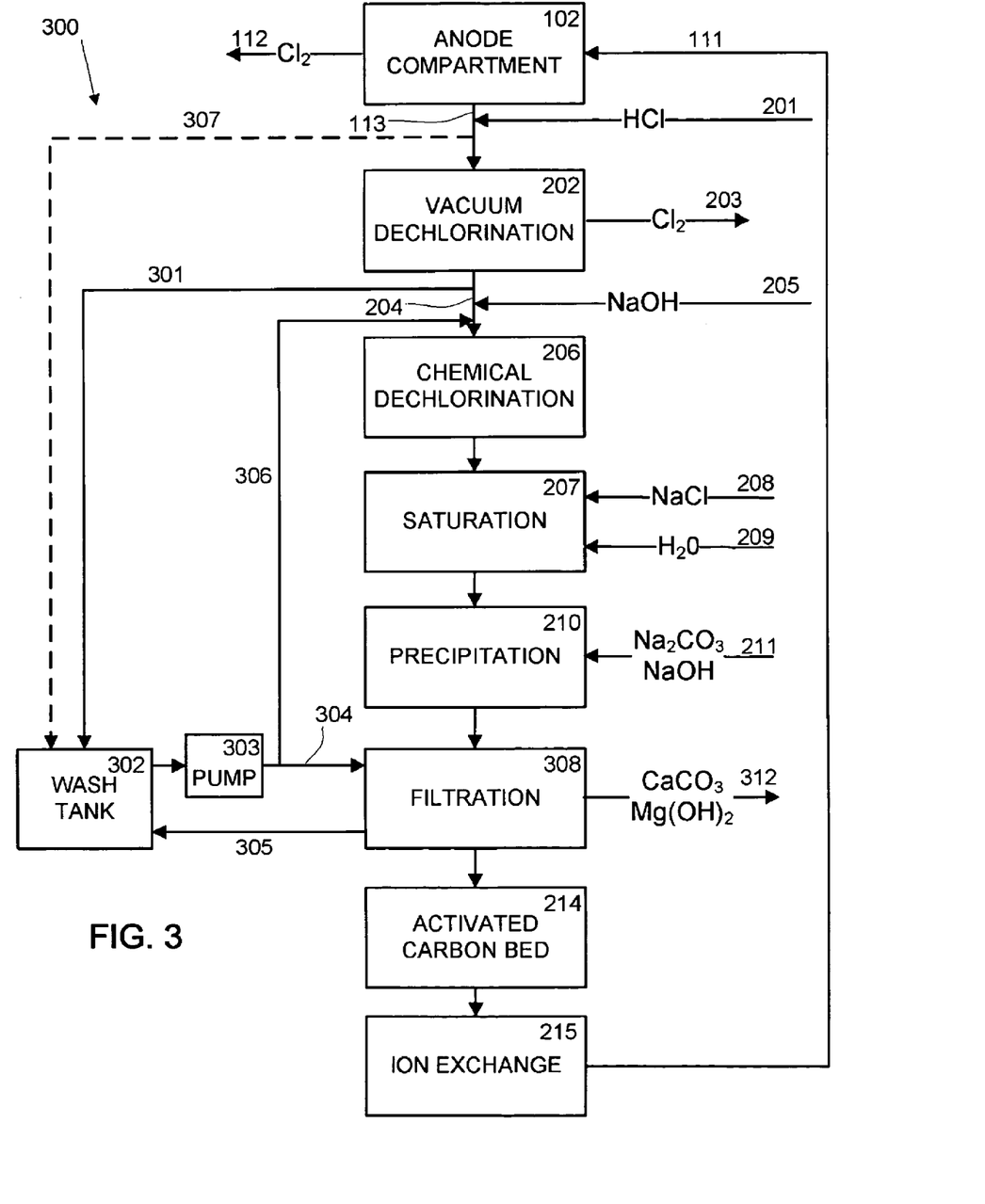
FIG. 3 is a block diagram of an embodiment of an improved brine loop of a chloralkali process flow.

FIG. 3 is a block diagram of an embodiment of an improved brine loop 300 of a chloralkali process flow. In the improved brine loop 300, the separation step 213, has been replaced with a filtration step 308. Alternatively, the separation step 213 (or portions thereof) may be retained and the filtration step 308 may be positioned downstream of the separation step 213 (or retained portion thereof). The filtration step 308 may incorporate one or more filters. The filters may be operable to filter out suspended solids, for instance $CaCO_3$ and $Mg(OH)_2$, that remain in the brine stream after the precipitation process 210. The filtration step 308 may incorporate known back-pulse filtration techniques to occasionally remove 312 accumulated particles (e.g., accumulated $CaCO_3$ and $Mg(OH)_2$ particles) from the filters. The filters may also be operable to filter organic contaminants from the brine stream. In this regard, organic contaminants may accumulate on the filters and at least a portion of the accumulated organics may not be removed by typical back-pulse filtration methods. Some mineral scaling may also accumulate on the filters. The mineral scaling may also be resistant to removal using typical back-pulse filtration methods. The organic contaminants may, for example, be introduced with the NaCl 208 and process water 209 introduced during the saturation step 207. These organic contaminants may negatively affect the performance of the anode compartment 102 and/or other processing equipment in the brine loop 300. Accordingly, it may be beneficial to filter out these organics at the filtration step 308.

As organics are filtered from the brine stream by the filters, the performance of the filters may degrade as materials (e.g., filtered organics, mineral scaling) build up on the filters. In this regard, the filters may need to be replaced or the materials that have built up on the filters may need to be removed at regular intervals. Typically, filter replacement is expensive. Filter washing may be a less expensive alternative to replacement, but typically would require special filter washing equipment along with dedicated filter washing chemicals.

The brine loop 300 of FIG. 3 illustrates an efficient alternative to filter replacement and/or special filter washing equipment using dedicated filter washing chemicals. In the brine loop 300, fluid is taken from the brine stream via connection 301 from a point in the brine loop 300 after vacuum dechlorination 202 and prior to the addition of NaOH 205. Such fluid taken from the brine stream will subsequently be referred to as cleaning solution.

The cleaning solution typically has a low pH value (e.g., is acidic) and may contain 20-30 parts per million (ppm) of active chlorine. This cleaning solution may be diverted to a wash tank 302. Water or other substances may be added to the cleaning solution to enhance the washing process. From the wash tank 302, the cleaning solution may be pumped by a pump 303 and run through one or more of the filters. The cleaning solution may be allowed to remain in contact with the one or more filters such that the one or more filters soak in the cleaning solution for a certain amount of time or the cleaning solution may be continuously pumped through the one or more filters for a certain amount of time. A combination of soak time and pumping may also be utilized. After running through the one or more filters, the cleaning solution may return to the wash tank 302 via fluid interconnection 305. It may then be recirculated through the one or more filters an appropriate number of times. The composition of the cleaning solution may be operable to change the organic contaminants that may have built up on the one or more filters from a first state to a second state, where the organic contaminants in the second state have a reduced affinity toward the one or more filters. Accordingly, the organic contaminants in the second state may pass through the one or more filters. One exemplary mechanism by which this may occur is where the cleaning solution breaks down (e.g., oxidizes) long chain molecules of the organic contaminants that may have built up on the one or more filters into smaller constituent parts that are no longer attracted to the one or more filters and therefore may pass through the one or more filters. Additionally, the cleaning solution, which as noted may have a low pH value, may also be operable to clean non-organic contamination (e.g., mineral scaling) from the one or more filters. In this manner, the one or more filters may be cleaned by exposure to the cleaning solution. Generally, the organic contaminants in the second state (e.g., reduced affinity toward the one or more filters) will not be harmful to the equipment used in the brine loop 300. The cleaning time may depend on several variables including contamination levels of the NaCl and introduced water, time between cleaning, and desired filter efficiency and may range, for example, from several minutes to an hour or more.

After washing of the one or more filters as described above, the cleaning solution may be returned to the wash tank 302. The pump 303 may then pump the cleaning solution back into the brine loop 300, returning the cleaning solution via a cleaning solution return interconnection 306 to a point in the process between vacuum dechlorination 202 and chemical dechlorination 202. It will be appreciated that by using already existing, in-process chemicals and returning those chemicals to the process, such a cleaning process requires no separate washing chemicals and can be performed with the one or more filters in situ.

In another configuration, the cleaning solution for the cleaning process may be obtained from the brine stream via fluid connection 307 at a point in the brine loop 300 after the addition of HCl 201 and prior to vacuum dechlorination 202. The brine stream at this point typically has a low pH and may contain about 200 ppm of active chlorine. Such obtaining of the cleaning solution for the cleaning process may include separating at least a portion of the brine stream into a feed solution, which may continue into the vacuum dechlorination step, and the cleaning solution, which may proceed to the wash tank 302.

In yet another configuration, a single fluid interconnection may exist between the wash tank 302 and pump 303, and the point in the chloralkali process between vacuum dechlorination 202 and chemical dechlorination 206. In such a configuration, the same fluid connection that is used to draw process fluid from the chloralkali process to the wash tank 302 may be used to return fluid from the wash tank 302 to the chloralkali process.

Figure 4:
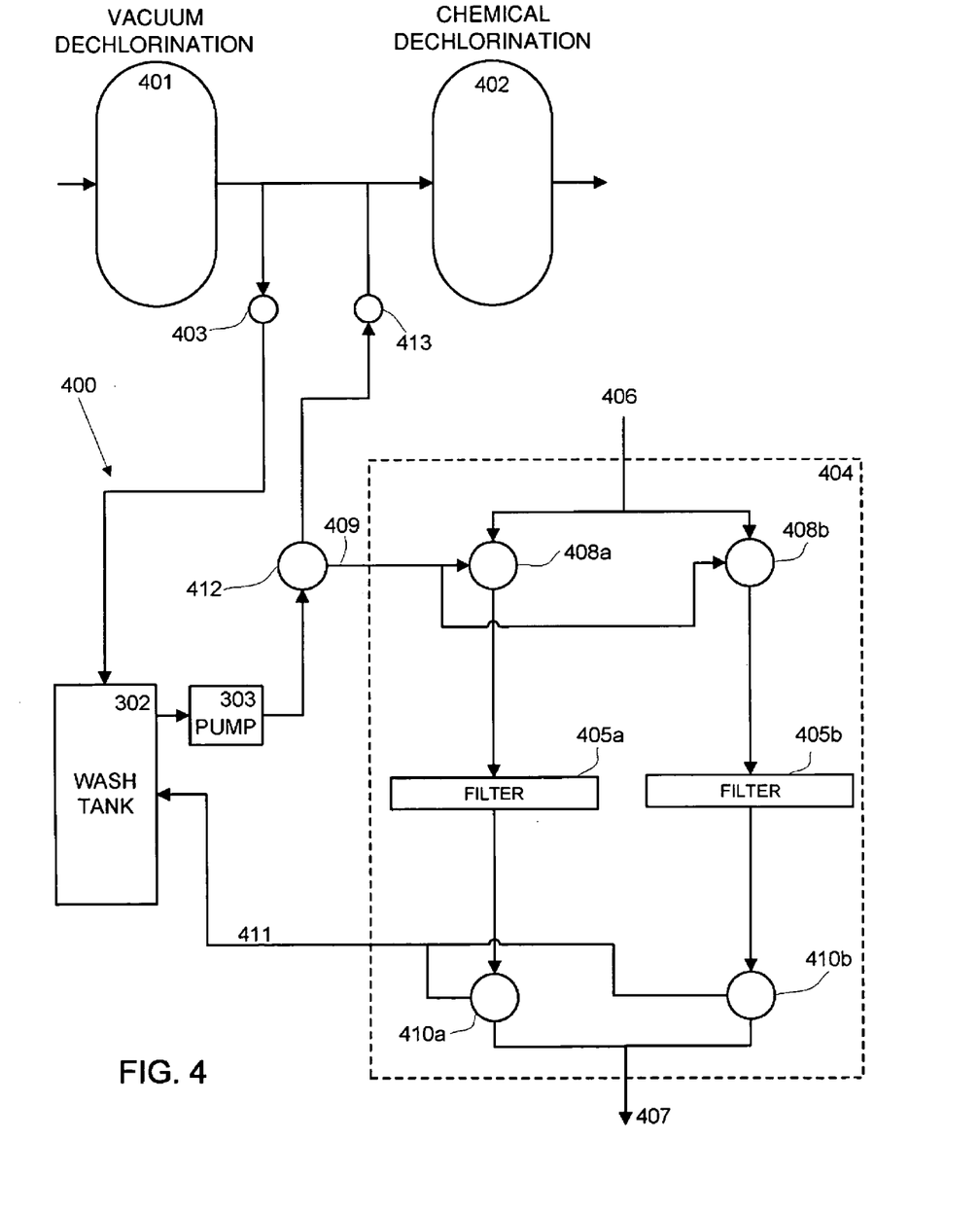
FIG. 4 is a block diagram of an apparatus for washing a filter used in a brine loop of a chloralkali process.

FIG. 4 illustrates an exemplary configuration of a filter washing system 400 integrated with a chloralkali process. The wash tank 302 is interconnected to the chloralkali process at a valve 403 disposed between a vacuum dechlorination apparatus 401 and a chemical dechlorination apparatus 402. Valve 403 may selectively divert a portion of the flow of the chloralkali process (e.g., from the flow between vacuum dechlorination apparatus 401 and chemical dechlorination apparatus 402) to the wash tank 302. Once a sufficient amount of flow, which will subsequently be referred to as cleaning solution, has been collected in the wash tank 302, the valve 403 may be set so that the normal chloralkali process flow from vacuum dechlorination apparatus 401 to chemical dechlorination apparatus 402 may continue.

A filtration apparatus 404 may be used to complete the filtration step 308. The filtration apparatus 404 may contain any appropriate number of filters, such as filter 405a or 405b. The input 406 to the filtration apparatus 404 may come from the preceding precipitation step 210 and the output 407 of the filtration apparatus 404 may continue to a subsequent processing step (e.g., activated carbon bed 214 or ion exchange 215). The filters may be non-precoated filters. Non-precoated filters may include any filter that separates solids from a fluid directly without the use of precoats or body aids. The filters may be in the form of membrane filters, tubes and/or filter bags. The filters may, for example, include one or more layers of PTFE, ePTFE, PVDF and/or other fluoropolymer membranes. ePTFE, in particular, generally is chemically inert and is operable to withstand exposure to a wide range of harsh chemical environments without significant damage. The filters may be comprised of laminates that include one or more of above-mentioned materials laminated to felts or woven fabrics. The filters may, for example, comprise nonwoven and/or spunbond fabrics of PVDF, polypropylene, and/or polyethylene.

To wash a filter, the filter must first be isolated from the chloralkali process flow. For example, to wash filter 405a, valve 408a may be changed form its normal operating position (connecting input 406 to filter 405a) to a position where only cleaning solution from a wash tank source line 409 may enter into the filter 405a. Furthermore, valve 410a may be changed form its normal operating position (connecting filter 405a to output 407) to a position where flow from the filter 405a is diverted back to the wash tank 302 via a wash tank return line 411. In this regard, the filter 405a may be isolated from the chloralkali process flow and interconnected to the membrane filter washing system 400. Meanwhile, other filters of the filtration apparatus 404, such as filter 405b may remain interconnected to the chloralkali process flow and may continue to operate in a normal fashion. The sizes and quantities of the various filters of the filtration apparatus 404 may be selected so that the chloralkali process flow may not be interrupted when one or more of the filters is removed form the chloralkali process flow for washing.

Once the filter 405a is isolated from the chloralkali process flow and interconnected to the filter washing system 400, the pump 303 may be activated and cleaning solution from the wash tank 302 may be circulated through the wash tank source line 409, through valve 408a, through filter 405a, through valve 410a, through wash tank return line 411, and back into wash tank 302. The fluid may be circulated in such a manner to wash the filter 405a until the filter 405a is satisfactorily cleaned. During the process, the pump 303 may be turned off or slowed down and the filter 405a may be allowed to soak in the cleaning fluid. A combination of washing and soaking may be utilized to clean the filter 405a.

Once the cleaning of the filter 405a is completed, the cleaning solution may be returned to the wash tank 302. The filter 405a may then be rinsed, for example with water, to remove residual oxidizer that may present. The filter 405a may then be returned to the chloralkali process flow by changing valve 408a back to its normal operating position (connecting input 406 to filter 405a) and changing valve 410a back to its normal operating position (connecting filter 405a to output 407). A valve 412 may be then set to connect the wash tank 302 to the chloralkali process flow at a point 413 between the vacuum dechlorination apparatus 401 and the chemical dechlorination apparatus 402. The pump 303 may then be activated and the cleaning solution may be pumped from the wash tank 302 back to the chloralkali process flow at point 413.

Other filters of the filtration apparatus 404 may be washed in a similar manner. For example, filter 405b may be washed by using valves 408b and 410b to isolate filter 405b from the chloralkali process and interconnect the filter 405b to the filter washing system 400.

The washing of the filters described above may be achieved in an automated fashion, manually, or through any combination thereof. For example, once a washing cycle is initiated, the wash tank 302 may be automatically filed, the filter to be cleaned may be automatically isolated from the chloralkali process, the washing cycle may be automatically conducted, and then the cleaning solution may be automatically returned to the chloralkali process.

The initiation of the washing cycle may also be automated or it may be operator-initiated. For example, sensors (e.g., flow sensors, pressure sensors) may monitor the performance of the filters within the filtration apparatus 404 and a washing cycle may be automatically initiated when the monitored performance of a particular filter meets predetermined criteria (e.g., once a predetermined pressure drop across a filter is sensed). Alternatively, a technician may monitor the performance of the filtration apparatus 404 and initiate a washing cycle when certain conditions are met. In another exemplary method of initiation of a washing cycle, washing cycles may be manually or automatically initiated at predetermined intervals (e.g., based on time or flow). The length of the predetermined intervals may be dependent on many factors, such as contamination levels, contamination composition, and desired filter efficiency.

The foregoing description of embodiments has been presented for purposes of illustration and description. Furthermore, the description is not intended to limit the present invention to the forms disclosed herein. Consequently, variations and modifications commensurate with the above teachings, and skill and knowledge of the relevant art, are within the scope of the present invention as defined by the claims that follow.

What is claimed is:

1. A method of brine electrolysis, the method comprising the steps of:
   a. providing a brine feed;
   b. treating said brine feed by mixing said brine feed with reactants to precipitate solids to form a treated brine solution;
   c. filtering said treated brine solution with a filter material to form a brine filtrate;
   d. purifying said brine filtrate by removing cations from said brine filtrate through an ion exchange process to form a purified brine;
   e. providing an electrolytic cell having a cathode disposed in a cathode compartment and an anode disposed in an anode compartment, said cathode compartment and said anode compartment being separated by a membrane;
   f. feeding said purified brine into said anode compartment whereby chlorine is liberated from said purified brine at the anode and sodium ion and water migrate through said membrane to said cathode compartment, whereby depleted brine is formed in said anode compartment;
   g. removing said depleted brine from said anode compartment;
   h. adding an acid to said depleted brine removed from said anode compartment;
   i. separating, after said adding an acid step, said depleted brine into a feed solution and a cleaning solution, wherein said feed solution is subjected to vacuum dechlorination and chemical dechlorination;
   j. adding NaCl to said feed solution and adjusting the concentration of NaCl by adding water to form said brine feed of step a; and
   k. contacting said filter material with said cleaning solution whereby at least some material is oxidized and removed from said filter material.

2. The method of claim 1, wherein said acid is HCL.

3. The method of claim 1, wherein said filter material comprises a membrane filter.

4. The method of claim 1, wherein said contacting step includes removing organic material from said filter.

5. In an improved method of brine electrolysis, the method comprising a brine solution saturation step, a treatment step, a filtration step, an ion exchange step, an electrolysis step, and at least one dechlorination step, wherein a first output of said at least one dechlorination step is an input to said brine solution saturation step, the improvement comprising:
   providing a second output from said at least one dechlorination step; and
   contacting a filter of said filtration step with at least a portion of said second output to oxidize and remove materials from said filter.

6. The improved method of brine electrolysis of claim 5, wherein said at least one dechlorination step comprises:
   a first vacuum dechlorination step; and
   a second chemical dechlorination step, wherein said second output is disposed after said vacuum dechlorination and before said chemical dechlorination step.

7. The improved method of brine electrolysis of claim 5, wherein said at least a portion of said second output comprises between about 0.01 ppm and about 200 ppm of active chlorine.

8. The improved method of brine electrolysis of claim 5, wherein said contacting step includes soaking said filter with said at least a portion of said second output.

9. The improved method of brine electrolysis of claim 5, in which said contacting step comprises circulating said at least a portion of said second output through said filter under pressure.

* * * * *